No. 766,340.

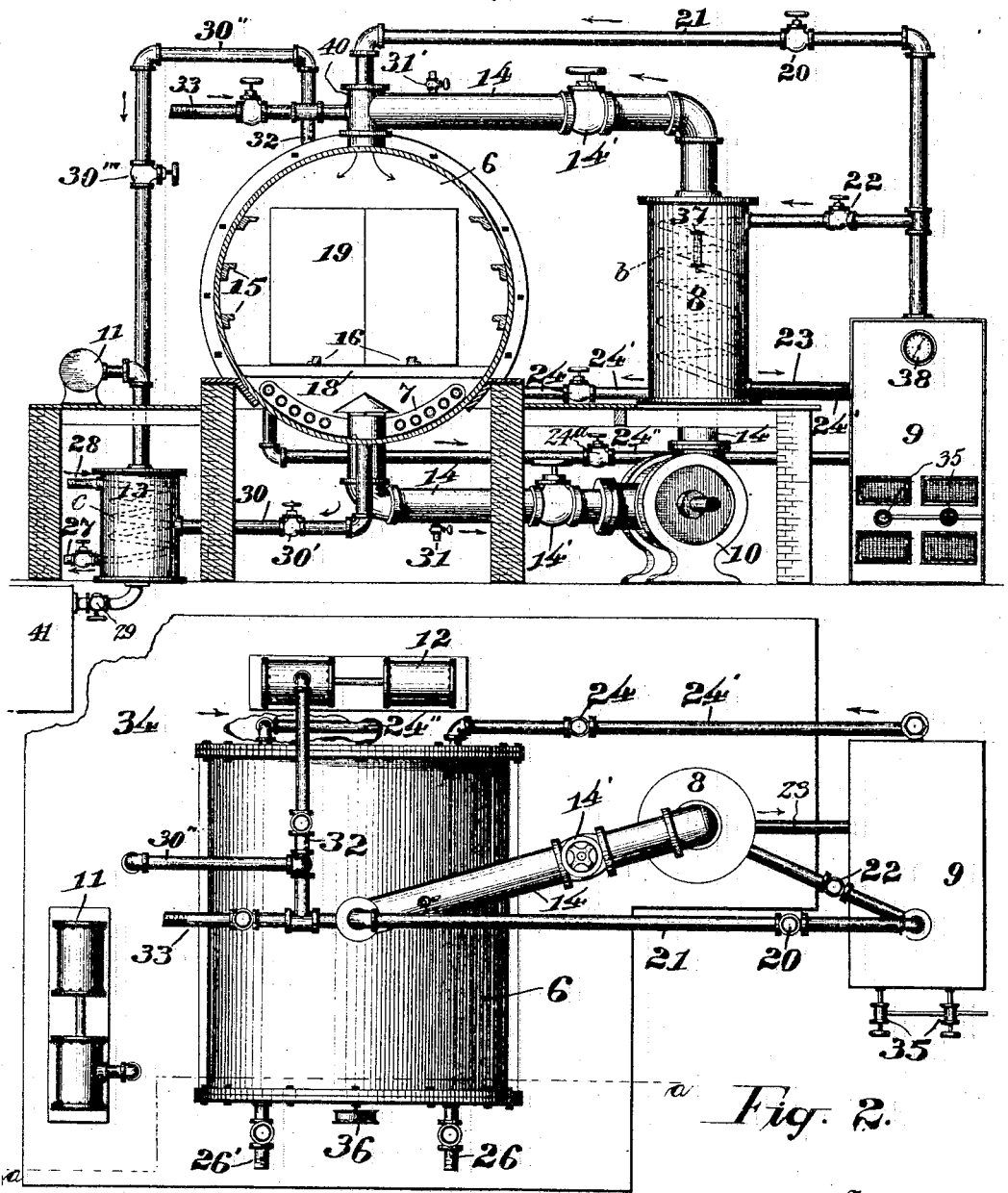

Patented August 2, 1904.

UNITED STATES PATENT OFFICE.

LOUIS GATHMANN, OF WASHINGTON, DISTRICT OF COLUMBIA, ASSIGNOR OF ONE-FOURTH TO ELDRED P. DICKINSON AND SOMERSET R. WATERS, OF WASHINGTON, DISTRICT OF COLUMBIA.

DRYING APPARATUS.

SPECIFICATION forming part of Letters Patent No. 766,340, dated August 2, 1904.

Application filed September 21, 1903. Serial No. 174,085. (No model.)

*To all whom it may concern:*

Be it known that I, LOUIS GATHMANN, a citizen of the United States of America, residing in Washington, District of Columbia, have invented certain new and useful Improvements in Drying Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My invention relates to improvements in apparatus for drying and preserving materials, more especially such as contain a comparatively large quantity of volatile liquids; and it consists in a chamber, means to maintain a diminished pressure therein while circulating, the atmosphere therein containing volatile constituents simultaneously with means to heat or cool said chamber, and means to subsequently supply the chamber with a preserving liquid for the material treated, and details of construction hereinafter to be pointed out and claimed.

Referring to the drawings, in which like parts are similarly designated, Figure 1 is a cross-section on line *a a*, Fig. 2; and Fig. 2 is a plan of the apparatus.

A cylindrical or other shaped drying-chamber 6 is suitably supported and provided with means to heat the same, in which means can be also used a cooling medium to cause said means to act as a condenser and which is here shown in the form of a radiator 7, connected by inlet-pipe 24' to a suitable steam-generator or hot-water heater 9 and having a return circulating-pipe 24", each of said pipes being provided with cut-off and regulator valves 24 and 24ᵃ, respectively. The chamber 6 is provided with brackets 15 to support removable drying-racks and with beams 18, on which are supported rails 16 for wheel-trucks. Suitable air-tight members or doors 19 are provided at one or both ends, as the exigencies of construction demand or permit.

To control or raise the temperature of the circulating atmosphere within the chamber or drum 6, I provide a heater 8, that contains, preferably, a coil *a*, connected at one end by a valved pipe 22 with the steam-generator or hot-water heater 9 and at the other end to a return-pipe 23. Through this heater 8 passes the pipe 14 or, as the case may be, the heater forms an enlarged chamber in said pipe 14. The pipe has valves 14' and opens into the top and bottom of the chamber 6, as shown. Included in this pipe-circuit between the chamber and heater is a rotary blower 10. Vents 31 and 31' are provided in the suction and forcing pipe-sections between the heater 8 and chamber 6 and between the latter and the drum. A steam-pipe 21, having a valve 20, admits live steam directly to the chamber when desired and preferably enters at the center of the inlet of the circulating-pipe 14 at the union 40. In this union 40 also terminates the valved pipe 33 to supply preserving fluid.

11 is a vacuum-pump connected to a condenser or tank 13, said tank containing a cooling-coil *c*, having an inlet 28 and a valved outlet 27 for the cooling medium. This tank is connected to a storage or outlet tank 41 by a valved pipe 29.

The tank 13 is connected by pipe 30, having a valve 30', to the bottom of the chamber 6 and by pipe 30", having a valve 30''', to the top of the chamber 6. A force-pump 12 is connected by pipe 32 to the top of said chamber 6, which is provided with a vacuum-gage 36.

35 represents the heating device for the boiler 9, in which liquid fuel is preferably used. The boiler has a steam-gage 38. A thermometer 37 is placed on the heater 8.

The operation will be as follows: The material to be treated is placed in the chamber 6 either on removable racks resting on the brackets 15 or in wheeled trucks on tracks 16. The doors 19 are closed, and steam or hot water is admitted to the radiator 7. Should it be desirable to subject the material to the direct action of steam, then live steam is admitted through pipe 21 by opening valve 20, any condensed steam passing through pipe 30 to chambers 13 and 41. The drying operation then begins after the live steam has been cut off, hot water or steam being admitted by pipe 22 into heater 8 and the rotary blower 10 set in operation, and at the same time the vacuum-pump 11 is started to maintain a rarefied atmosphere in chamber 6 during the circulation of said rarefied medium by blower 10. The vapors arising from the material due to the circulation of the hot rarefied medium are drawn by the pump 11 to the chamber 13, where they come in contact with the cooling-coil 28 27, and such condensable by-products are secured as the specific material treated contains.

Should it be wood that is dried, the exhaustion and heating will be kept up until it is thoroughly dried, and then, if so intended, an impregnating fluid is admitted through pipe 33, the valves 14' and 30' being previously closed. After the admission of the preserving fluid the valve in pipe 33 is closed and the pressure-pump 12 started to pump compressed air on top of the liquid covering the wood to force said liquid into the pores of the wood. Heat is then cut off from the radiator 7, or it may have been done previously to the entrance of the preserving fluid and the liquor run off through valve 30', cooler 13, pipe 29 to tank 41, from where it is pumped to the reservoir. (Not shown.) The wood is then given a sufficient drying to be handled, all valves are shut, and the chamber 6 opened.

Having described my invention, what I claim as new therein, and desire to secure by Letters Patent, is—

1. The combination with a closed chamber, of a radiator therein to heat and to cool said chamber, a vacuum-pump connected to the chamber, an intermediate chamber between the pump and the latter to receive vapors drawn from the chamber, a coil in the intermediate chamber to condense vapors drawn therethrough by the pump, a heater connected at both ends to the closed chamber, a means between the closed chamber and heater to circulate the atmosphere maintained therein at a reduced pressure by the pump, and means to supply steam to the interior of the closed chamber, substantially as described.

2. The combination with a closed chamber, of a radiator therein to heat and to cool said chamber, means to admit either a hot or a cold fluid to the radiator, a heater having a pipe connection at both ends with said chamber, a blower in the pipe connection between the chamber and heater, a second chamber connected to the top and bottom of the closed chamber containing a condensing-coil and a vacuum-pump to exhaust the second chamber and thereby maintain an atmosphere in the closed chamber below atmospheric pressure during the circulation of said atmosphere by the blower, means to admit live steam directly into the closed chamber, valves to control all connections with the closed chamber, means to admit liquid at the top of the chamber and a pump to pump air on top of the liquid so admitted, substantially as described.

3. The combination with a closed chamber, of a heater, a union connected to the top of the chamber and heater, a pipe connecting the bottom of the chamber and heater having a blower therein to maintain a circulation of the atmosphere within the closed circuit thus formed to admit steam downwardly through the union into the closed chamber, a pipe to admit preserving fluid and one to admit compressed air through the union into the chamber, a second chamber connected to the top and to the bottom of the closed chamber, a condensing-coil therein and a vacuum-pump connected to the second chamber to maintain the circulating atmosphere within the circuit below atmospheric pressure and draw the excess of vapors past the condensing-coil in the second chamber to recover condensable products, substantially as described.

In testimony that I claim the foregoing as my invention I have signed my name in presence of two subscribing witnesses.

LOUIS GATHMANN.

Witnesses:
HENRY ORTH, Jr.,
WILLIAM O. RAY.